(12) United States Patent
Van Den Driessche

(10) Patent No.: US 10,395,464 B2
(45) Date of Patent: Aug. 27, 2019

(54) CUP DISPENSING APPARATUS IN A BEVERAGE VENDING MACHINE

(71) Applicant: EVOCA S.P.A., Milan (IT)

(72) Inventor: Samuel Van Den Driessche, Valbrembo (IT)

(73) Assignee: EVOCA S.P.A., Milan (IT)

( * ) Notice: Subject to any disclaimer, the term of this patent is extended or adjusted under 35 U.S.C. 154(b) by 0 days.

(21) Appl. No.: 15/749,387

(22) PCT Filed: Aug. 18, 2016

(86) PCT No.: PCT/IB2016/054952
§ 371 (c)(1),
(2) Date: Jan. 31, 2018

(87) PCT Pub. No.: WO2017/029638
PCT Pub. Date: Feb. 23, 2017

(65) Prior Publication Data
US 2018/0225907 A1    Aug. 9, 2018

(30) Foreign Application Priority Data

Aug. 18, 2015 (IT) .......................... 102015000045177

(51) Int. Cl.
*B65G 59/10* (2006.01)
*G07F 13/10* (2006.01)
*A47F 1/08* (2006.01)

(52) U.S. Cl.
CPC .............. *G07F 13/10* (2013.01); *A47F 1/085* (2013.01); *B65G 59/108* (2013.01)

(58) Field of Classification Search
CPC ........... A47F 1/106; A47F 1/123; A47F 1/085
See application file for complete search history.

(56) References Cited

U.S. PATENT DOCUMENTS

| 1,593,717 A | * | 7/1926 | Frick ................... B65G 59/105 221/223 |
| 1,634,566 A | | 7/1927 | Wessman |

(Continued)

FOREIGN PATENT DOCUMENTS

| EP | 1575006 A1 | 9/2005 |
| GB | 1152414 A | 5/1969 |

(Continued)

OTHER PUBLICATIONS

International Search Report and Written Opinion for International Application No. PCT/IB2016/054952 dated Nov. 28, 2016.

(Continued)

*Primary Examiner* — Jacob S. Scott
*Assistant Examiner* — Ayodeji T Ojofeitimi
(74) *Attorney, Agent, or Firm* — Dorsey & Whitney LLP

(57) ABSTRACT

A cup dispensing apparatus comprising at least one magazine adapted to accommodate a stack of cups, and a releasing device, which has a vertical channel designed to be engaged by the stack, is configured to support the stack and release, when operated, the last cup, and is equipped with at least three releasing elements movable on a horizontal plane in respective directions substantially tangential to said channel, between a rest position, in which they define a horizontal first support plane designed to be engaged by the last cup to support the stack, and a release position, in which they define a second support plane at a higher level than the first support plane and designed to be engaged by the penultimate cup to support the rest of the stack; each releasing device has an associated separating device adapted to impart a downward detaching thrust on the last cup.

10 Claims, 10 Drawing Sheets

(56) References Cited

U.S. PATENT DOCUMENTS

| | | | |
|---|---|---|---|
| 2,946,481 | A | 7/1960 | Herman |
| 3,098,585 | A | 7/1963 | Giepen et al. |
| 3,932,978 | A | 1/1976 | Kinney |
| 4,426,017 | A | 1/1984 | Ficken et al. |
| 5,518,149 | A * | 5/1996 | Lotspeich ............ B65G 59/108 221/222 |
| 2011/0284572 | A1 | 11/2011 | Meyer et al. |
| 2014/0001195 | A1* | 1/2014 | Patterson ................ G07F 13/10 221/1 |

FOREIGN PATENT DOCUMENTS

| | | |
|---|---|---|
| GB | 2103194 A | 2/1983 |
| GB | 2291867 A | 2/1996 |
| WO | 2008141396 A1 | 11/2008 |

OTHER PUBLICATIONS

Reply to Second Written Opinion for International Application No. PCT/IB2016/054952 filed Sep. 15, 2017.
Reply to the Written Opinion for International Application No. PCT/IB2016/054952 filed Jun. 15, 2017.
Second Written Opinion for International Application No. PCT/IB2016/054952 dated Aug. 9, 2017.

* cited by examiner

CUP DISPENSING APPARATUS IN A BEVERAGE VENDING MACHINE

TECHNICAL FIELD OF THE INVENTION

The present invention relates to a cup dispensing apparatus in a beverage vending machine.

STATE OF THE ART

In beverage vending machines, it is known to use cup dispensing apparatuses comprising one or more dispensing groups, each of which in turn comprises a magazine housing a stack of cups and a releasing device, which is configured to support the stack and, when activated, separate the last cup from the bottom of the stack to leave it free to fall into a fixed or movable receiving device designed to convey the cup to a filling station.

There are many types of releasing devices on the market. However, in general, they suffer from the drawback of having a relatively complicated structure and occupying a relatively large amount of space. This drawback is naturally aggravated in case where the dispensing apparatus comprises several dispensing groups in order to have a larger storage capacity and, particularly, to allow the dispensing of different sized cups.

Releasing devices of known type that suffer from this drawback are, for example, releasing devices that use a plurality of cam release elements with a spiral profile, which are distributed around the stack to support it and are rotated about their respective axes to release the last cup.

Releasing devices of this type are known, for example, from EP1575006, U.S. Pat. Nos. 3,932,978, 4,426,017, GB2103194, WO2008/141396, U.S. Pat. Nos. 1,634,566, 2,946,481, GB1152414, GB2291867 and U.S. Pat. No. 3,098,585.

OBJECT AND SUMMARY OF THE INVENTION

The object of the present invention is to provide a cup dispensing apparatus, this apparatus being simple and inexpensive to manufacture and capable of eliminating the above-described drawback.

In accordance with the present invention, a cup dispensing apparatus is provided for a beverage vending machine as claimed in claim 1 and, preferably, as claimed in the appended claims.

BRIEF DESCRIPTION OF THE DRAWINGS

The present invention will now be described with reference to the accompanying drawings, which illustrate a non-limitative embodiment, in which.

DETAILED DESCRIPTION OF PREFERRED EMBODIMENTS OF THE INVENTION

Figure 1:
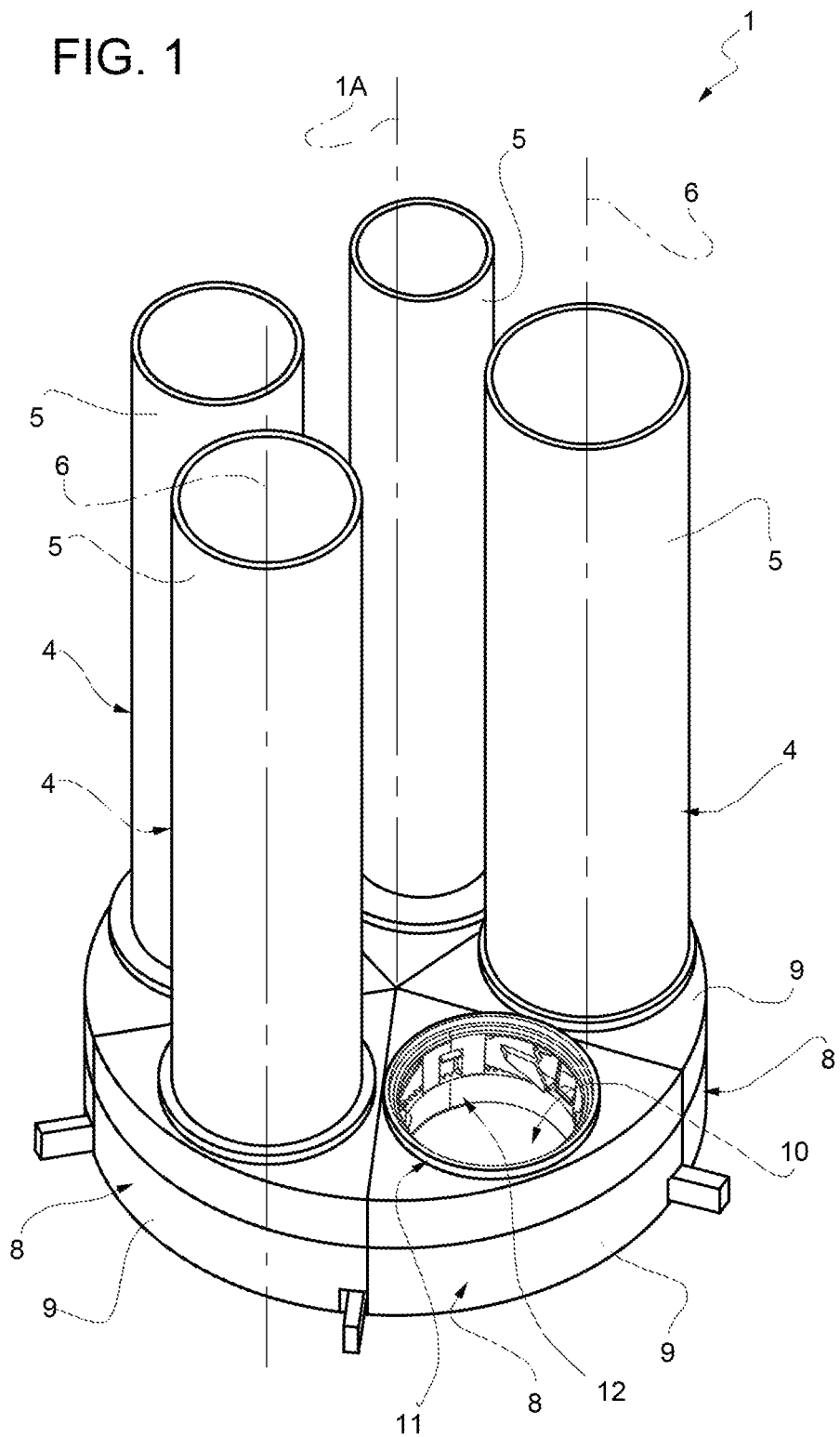
FIG. 1 shows a perspective view, with parts removed for clarity, of a preferred embodiment of the cup dispensing apparatus according to the present invention.

In FIG. 1, reference numeral 1 indicates, as a whole, an apparatus for dispensing cups 2 designed for being housed inside a beverage vending machine (not shown).

Figure 4:
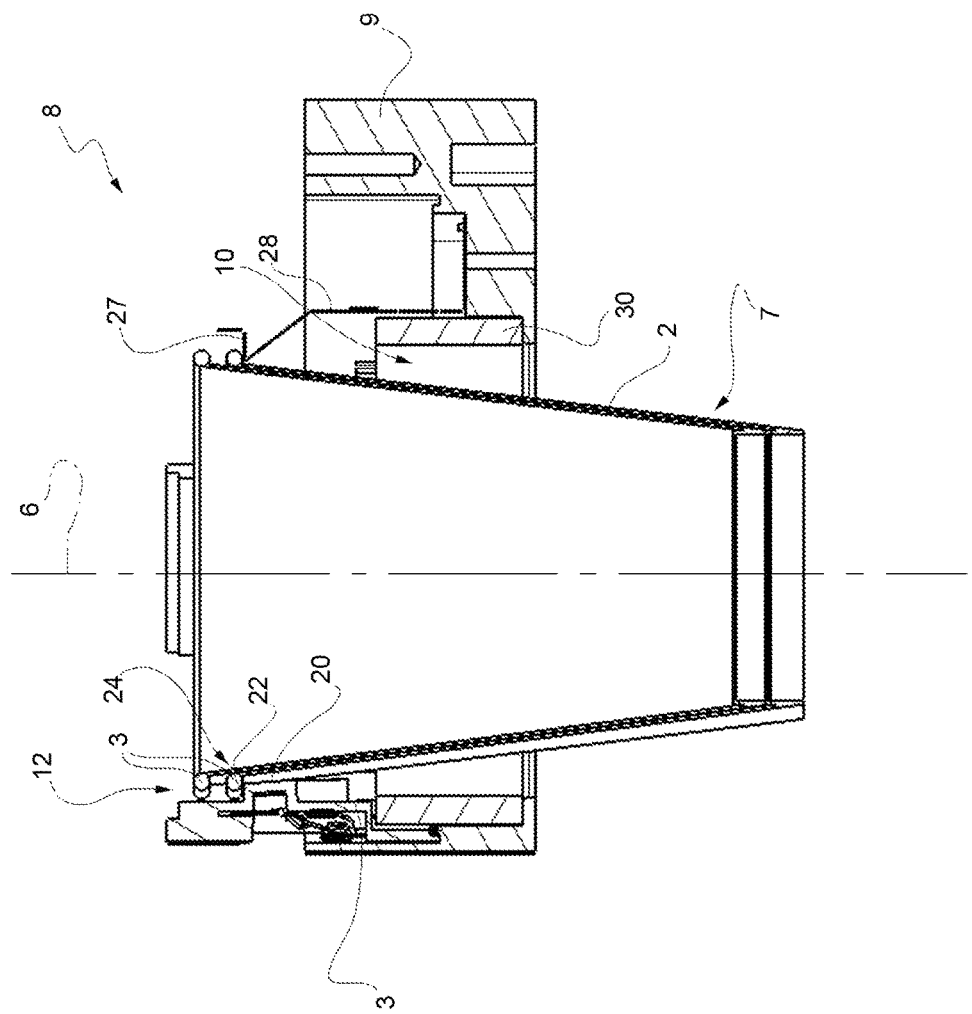

As shown in FIG. 4, the cups 2 usable in the apparatus 1 are known types of cups normally used in beverage vending machines; in the example described, each cup 2 is defined by a cup-shaped body made of a plastic or paper material having a side surface with the shape of a truncated cone, which is provided with an external annular flange 3 of a certain diameter on its larger base and is closed on its smaller base by a flat bottom surface.

In the vending machine, during a normal beverage production cycle, the function of the apparatus 1 is to supply an empty cup 2 to a collection device (not shown), which is arranged in a fixed release station located beneath the apparatus 1 and can be defined by either a fixed slide or a movable member to convey the empty cup 2 to a filling station, where cup 2 is filled with the ingredients forming the beverage or the beverage itself.

The apparatus 1 is formed by a whole number of dispensing groups 4, each of which is structurally and functionally independent of the other dispensing groups 1 and comprises a respective magazine 5, which is defined by a tubular casing having a vertical axis 6 and designed to contain a stack 7 of cups 2, and a respective releasing device 8, which is placed beneath the lower outlet opening of the magazine 4 and is designed to be transversely engaged by the stack 7 to detach, as and when required, a cup 2 from the bottom of the stack 7.

The apparatus 1 can comprise just one dispensing group 1 arranged in a fixed manner over the above-mentioned release station, or, preferably, the apparatus 1 can comprise a plurality of dispensing groups 4 that, as shall be better seen hereinafter and as shown in FIG. 1, are arranged around a central rotation axis 1A and are moved, in use, along a circular path coaxial to axis 1A to occupy the release station, one at a time.

Figure 2:
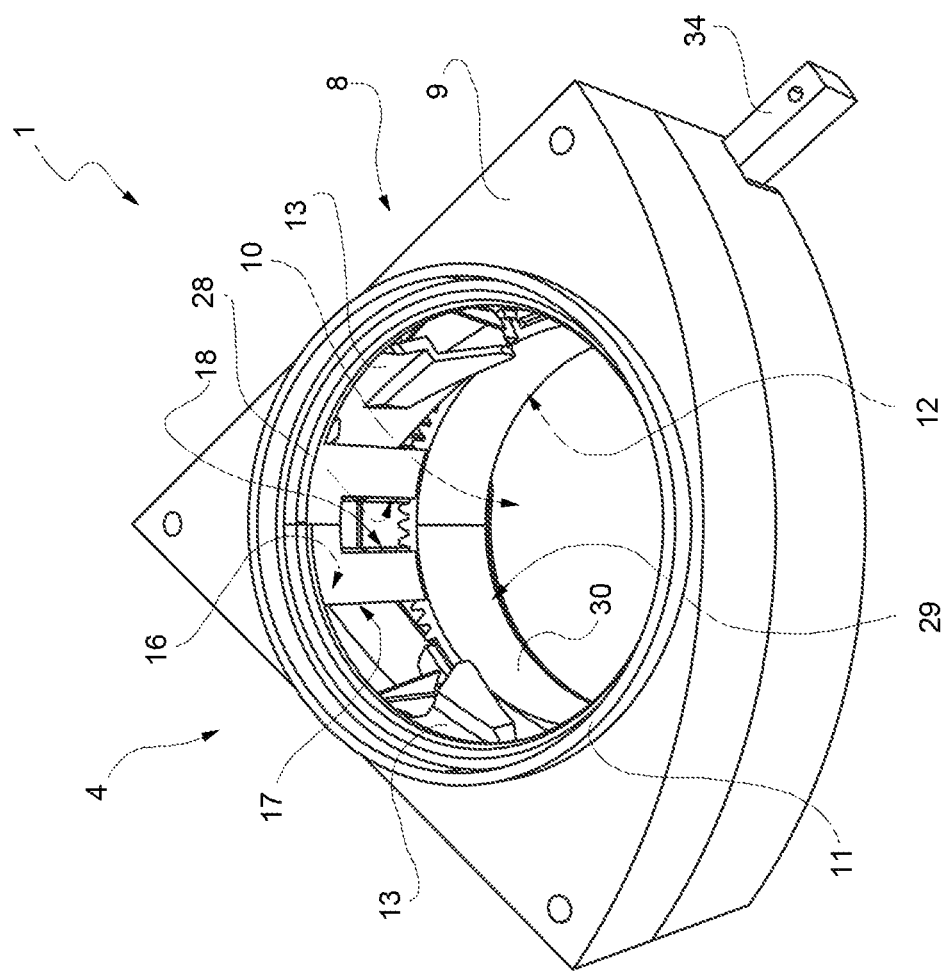
FIG. 2 is a perspective view, with parts removed for clarity, of a detail of a dispensing group forming part of the dispensing apparatus in FIG. 1.
Figure 3:
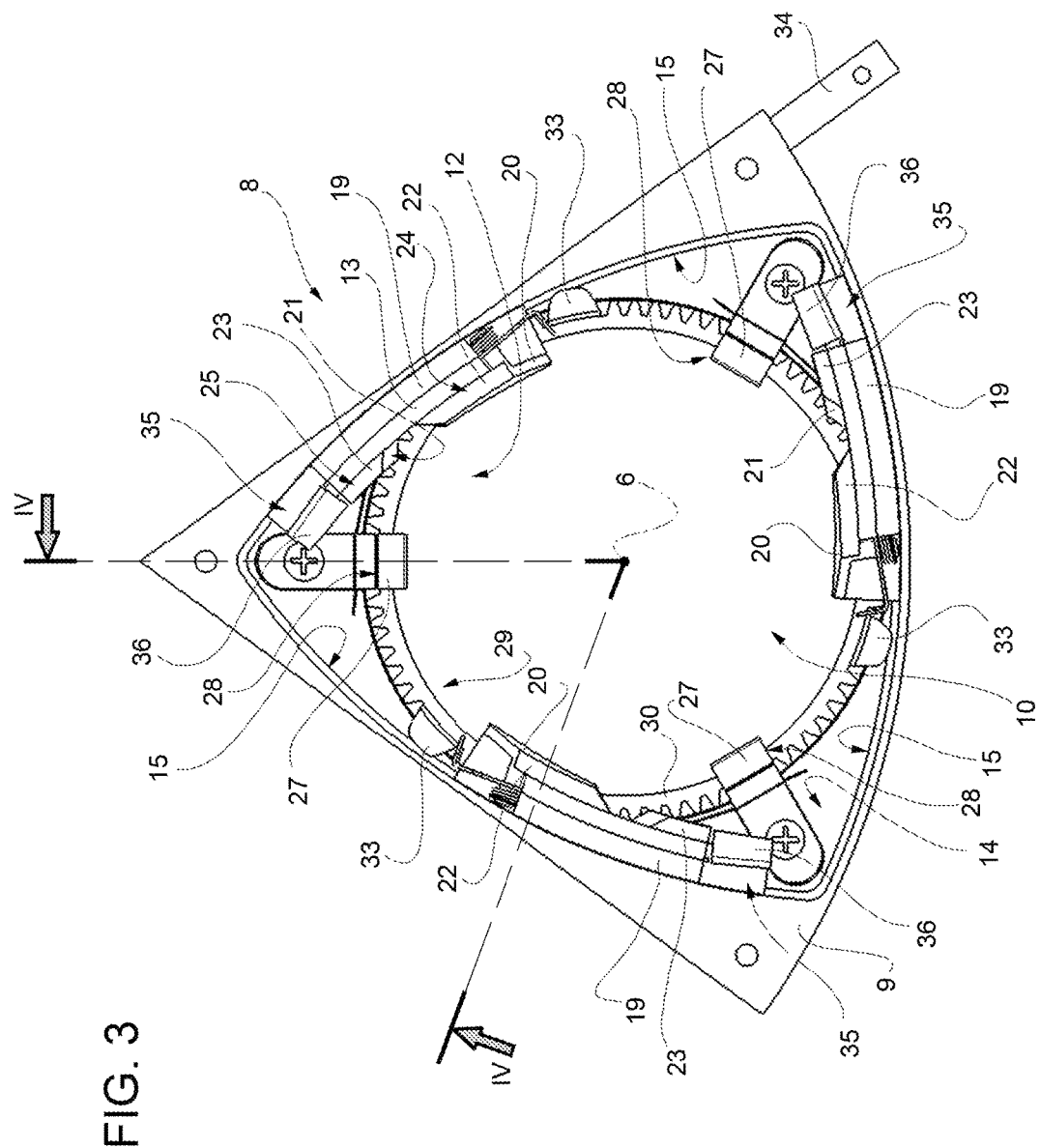
FIGS. 3 and 4 show, in plan and section, respectively, the dispensing group of FIG. 2 in a first operating configuration.

As shown in FIGS. 2 and 3, each releasing device 8 comprises an outer casing 9 having a central through opening, which defines a discharge channel 10 for the cups 2 coaxial with axis 6 and has a diameter larger than the outer diameter of the flanges 3 of the cups 2.

The casing 9 is bounded at the top by a flat surface, which carries, along the free upper edge of the channel 10, a connected cylindrical appendage 11 designed to be engaged by a lower end of the magazine 5 to connect the latter to the casing 9 in a removable manner.

The casing 9 internally houses a support and release mechanism 12 for the cups 2 comprising three release segments 13, which are evenly distributed around axis 6 at an angular distance of 120° from one another, lie on a horizontal plane perpendicular to axis 6 and are each movable on said plane, along a respective horizontal path extending in a direction generically tangential to the channel 10, between a rest position, in which they vertically support the stack 7, and a release position, in which they leave the last cup 2 free to detach itself while supporting the rest of the stack 7.

In particular, the three segments 13 are housed in a cavity 14, which is made in the casing 9 and is bounded at the sides by three curvilinear walls 15, each of which defines the path of a respective segment 13 and forms, with each of the other two curvilinear walls 15 adjacent thereto, an ogival arc having a vertex angle of approximately 120°. In other words, the three curvilinear walls 15, as a whole, give the cavity 14 the shape of an equilateral triangle with curvilinear sides circumscribing the channel 10.

As shown in FIG. 2, the cavity 14 is closed on the side facing the axis 6 by a cylindrical wall 16, which is integral with the casing 9 and defines an upper portion of the channel 10. The cylindrical wall 16 has three larger openings 17, which each extend in front of a central portion of a respective curvilinear wall 15, and are arranged in alternating positions with three smaller openings 18, each of which faces an intersecting corner of two corresponding curvilinear walls 15.

Each segment 13 is housed inside the cavity 14 in a respective opening 17 and is movable in the space between the cylindrical wall 16 and the respective curvilinear wall 15.

Figure 9:
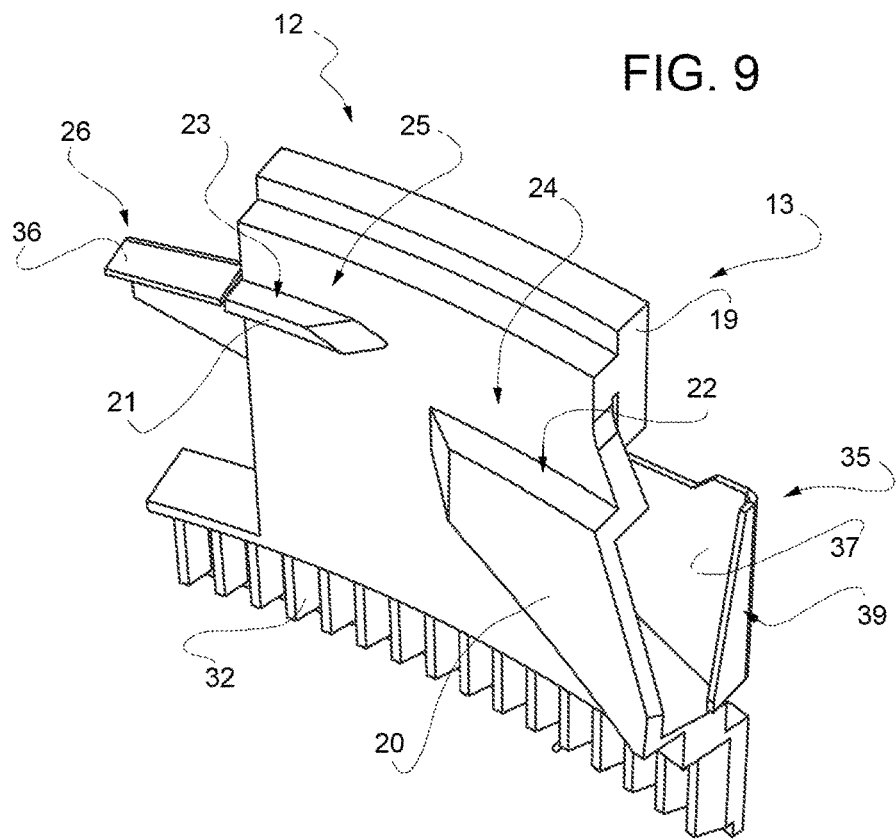
FIGS. 9 and 10 respectively show a front and a rear perspective view, on an enlarged scale, of a detail of the dispensing group in FIG. 2.
Figure 10:
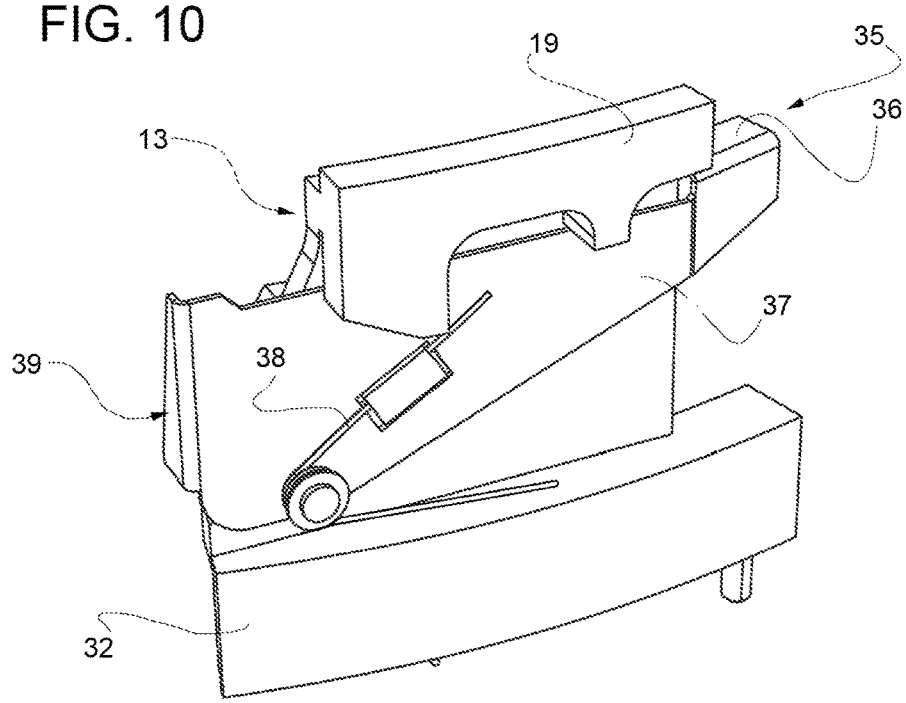

In particular, as shown in FIGS. 9 and 10, each segment 13 comprises a substantially vertical wall, which is provided on the side facing the casing 9 with a curved rib 19 slidingly coupled to the corresponding curvilinear wall 15 and having the function of guiding the segment 13 along the respective path during its movement from and to the rest position.

On the opposite side to the rib 19, each segment 13 carries two connected protrusions 20 and 21, which are horizontally and vertically staggered from each other and are bounded at the top by respective horizontal flat surfaces 22 and 23.

In particular, with reference to FIGS. 3 and 9, protrusion 20 is arranged in front of protrusion 21, in the direction of forward movement of the segment 13 from the rest position to the release position, and at a lower level with respect to protrusion 21, and its upper surface 22 is coplanar with surfaces 22 of the other protrusions 20 to define, with the latter, a horizontal support plane 24 for the stack 7 when the support and release mechanism 12 is in its rest position.

Protrusion 21 of each segment 13 is arranged behind protrusion 20 of the same segment 13, in the aforementioned direction of forward movement, and at a higher level with respect to protrusion 20, and its upper surface 23 is coplanar with surfaces 23 of the other protrusions 21 to define, with the latter, a horizontal support plane 25 for the stack 7 when the support and release mechanism 12 is in the release position.

On the end facing the respective protrusion 20, each protrusion 21 has a generically wedge-shaped portion, which defines, on the surface 23 of the protrusion 21, an inclined surface facing protrusion 20 and has, as shall be better seen hereinafter, the function of aiding the insertion of protrusion 21 between the flanges 3 of two stacked cups 2.

Figure 6:
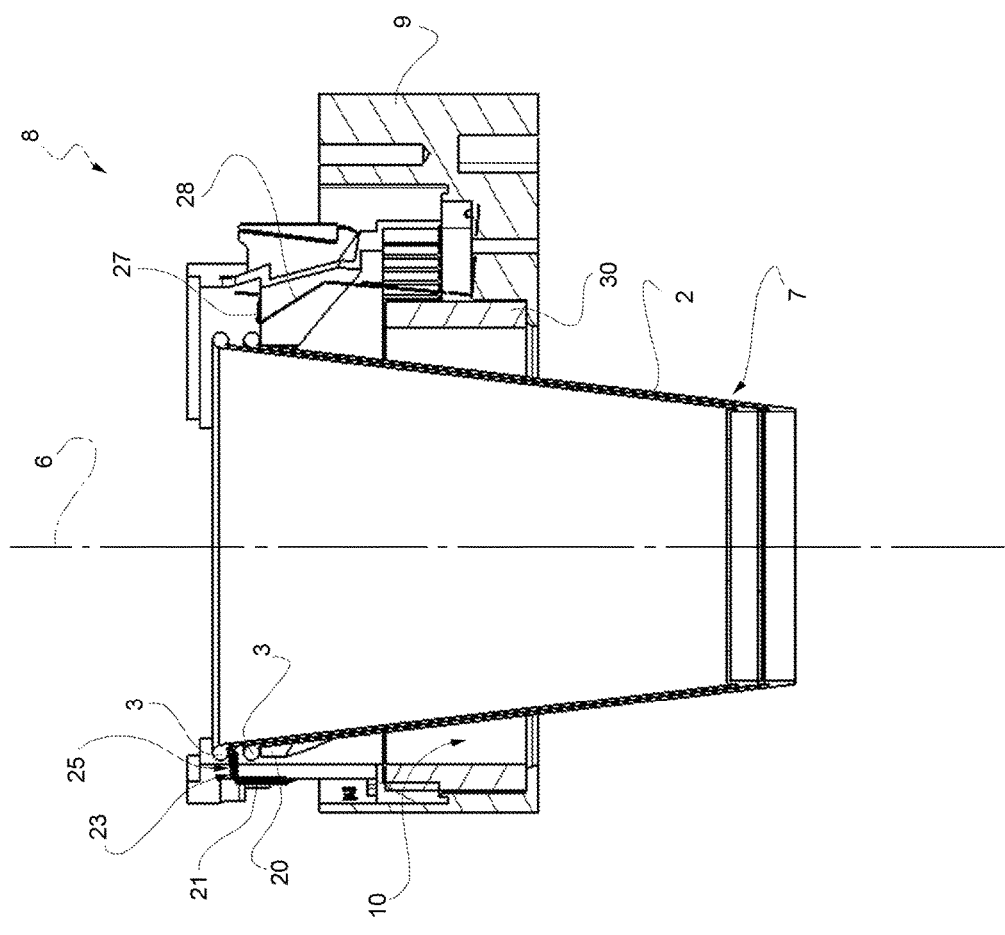

In this regard, as shown in FIGS. 4 and 6, in order to fit in between the flanges 3 of two stacked cups 2, protrusions 21 must have a vertically-measured thickness less than the gap existing between the two flanges 3, and the lower and upper support planes 24 and 25 must be arranged at a distance from each other approximating by excess to the distance between the lower edges of two consecutive flanges 3.

As shown in FIGS. 3 and 4, in addition to protrusions 20, the support and release mechanism 12 preferably comprises further support means that have the function of stabilizing the position of the stack 7 in the rest position. These further support means comprise three thin plates 27, which extend transversely through the smaller openings 18 and each define the upper free end of respective flat springs 28 fixed to the casing 9.

The three flat springs 28 are movable, in a manner described hereinafter, from and to an advanced rest position, in which the respective thin plates 27 extend horizontally inside the channel 10 and are coplanar with surfaces 22 of protrusions 20 and define part of the support plane 24.

As shown in FIGS. 2 and 9, the support and release mechanism 12 is operated, in use, by an actuating device 29, which is part of the releasing device 8 and comprises a toothed ring 30 coupled to the segments 13 to move them along the respective paths between the respective rest and release positions. The toothed ring 30 is mounted on the casing 9 in a position coaxial with axis 6 so as to define, with its inner cylindrical surface, a cylindrical outlet portion of the channel 10, and has external toothing 31 meshing with three toothed sectors 32, each one provided on a lower portion of a respective segment 13.

On the side facing the casing 9, the toothed ring 30 rigidly carries three bosses 33, which are equidistant about axis 6, radially protrude from the toothed ring 30 and each have the function, in use, of intercepting a respective flat spring 28, following a rotation of the toothed ring 30 in the aforementioned direction of forward movement, to move the flat spring 28 from the aforementioned advanced rest position to a retracted position of non-interference, in which the respective thin plate 27 is radially outside the channel 10.

The toothed ring 30 can be activated from the outside in a number of ways suitable for this purpose. In the example shown, the toothed ring 30 is set in rotation about axis 6 by a motorized rack (not shown) meshing with the toothed ring 30 and connected, via a coupling shank 34 (FIG. 2), to a suitable means of actuation.

Lastly, the support and release mechanism 12 comprises a separating device 35 having the function of cooperating with the segments 13 to ensure, in use, the effective detachment of the last cup 2 from the stack 7 during the release step.

In particular, the separating device 35 comprises three separator elements 36, each of which is mounted on board a respective segment 13 and is movable, as a consequence of the movement of the segment 13, between: an inoperative position, in which it is arranged outside of the channel 10; an intermediate position, in which it is inserted between the flange 3 of the last cup 2 and the flange 3 of the penultimate cup 2 of the stack 7; and a detachment position, in which the separator element 36 is moved downwards and, together with the other separator elements 36, imparts a downward force on flange 3 of the last cup 2 of the stack 7 that causes its separation from the rest of the stack 7.

As shown in FIGS. 9 and 10, each separator element 36 is defined by a thin appendage, projecting towards the channel 10, of a respective hinged plate 37, with interposition of a spring 38 on the side of the respective segment 13 facing the casing 9.

Figure 11:
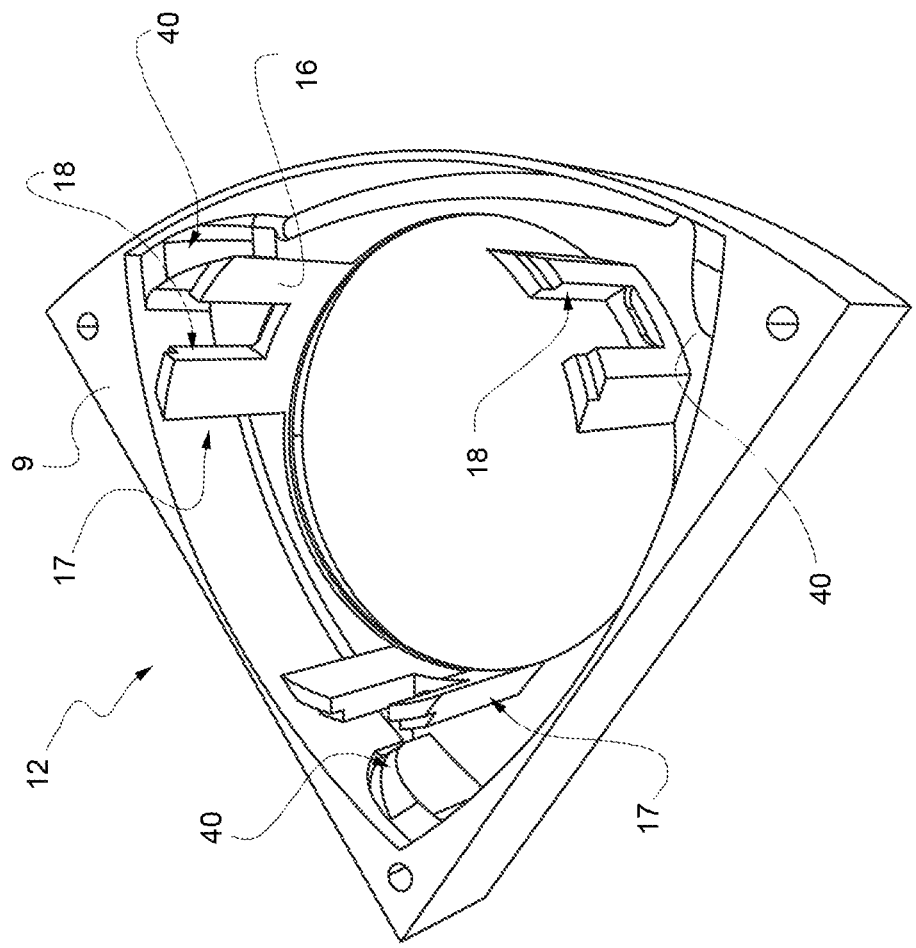
FIG. 11 shows a perspective view of a further detail of the dispensing group in FIG. 2.

The separator element 36 is located on a rear end, in the aforementioned direction of forward movement, of the respective plate 37 and, in the rest state, is substantially coplanar with surface 23 of protrusion 21 of the same segment 13. At the opposite end, the plate 37 has a shaped edge 39, which projects from the respective segment 13 and is designed to intercept, when the segment 13 is close to the release position, a respective fixed abutment 40 provided in the casing 9 (visible in FIG. 11, which shows an upper portion of the casing 9 head down) to cause an oscillation of the plate 37 about the respective axis and move the separator element 36 downwards from the intermediate operative position to the operative position of detachment.

As shown in FIGS. 1 and 2, although the support and release mechanism 12 can be coupled to a casing 9 having any kind external shape, such as circular for example, the casing 9 preferably has a wedge-like shape on the outside. This shape enables optimizing the compactness of the structure of the support and release mechanism 12.

FIG. 1 shows an apparatus 1 composed of a plurality of dispensing groups 8 comprising respective magazines 5 and respective releasing devices 8, the casings 9 of which are wedge-shaped and arranged radially, in contact with each other and around the aforementioned rotation axis 1A, which is parallel to the axes 6, so as form a compact assembly occupying a relatively small amount of space.

In general, the larger the size of the cups 2 dispensed by the corresponding releasing device 8, the greater the angular width of each casing 9 of the apparatus 1.

By virtue of the wedge-like shape of the casings 9, the number and size of the casings 9 in the apparatus 1 can vary, for the same overall external size of the apparatus 1, depending on how many types and sizes of the cups 2 it is wished to dispense.

In use, after a user has selected a beverage, the apparatus 1 is operated by external actuators to rotate about axis 1A so as to bring the dispensing group 4, or one of the dispensing groups 4 containing the type of cups 2 suitable for being used to contain the selected beverage, to the aforementioned fixed release station. Once the selected dispensing group 4 has been stopped at the release station, the respective actuating device 29 is operated to activate the respective support and release mechanism 12 and cause the release of the cup 2 on the bottom of the stack 7.

The operation of the support and release mechanism 12 will be described hereinafter with reference to three configurations that the support and release mechanism 12 assumes during a complete work cycle. In particular, a work cycle comprises a forward movement, during which the segments 13 are moved from the rest position to the release position and which ends with the release of a cup 2, and a return movement, during which the segments 13 are returned from the release position to the rest position and which ends with the repositioning of the stack 7 inside the channel 10. The forward and return movements correspond to an oscillation of a certain angle, approximately 20°-30°, of the toothed ring 30 about axis 6.

In particular, the three configurations that shall be referred to hereinafter correspond to an initial position (shown in FIGS. 3 and 4), an intermediate position (shown in FIGS. 5 and 6), and a final position (shown in FIGS. 7 and 8) of the support and release mechanism 12 during the aforementioned forward movement.

Initial Position—FIGS. 3 and 4

In this position, the segments 13 are arranged in the respective rest positions and the flat springs 28 are arranged in the respective advanced operative positions. In this position, protrusions 20 and the thin plates 27 extend transversely through the respective larger openings 17 and protrude towards the inside of the channel 10, and the flange 3 of the last cup 2 rests on support plane 24.

In this position, the separator elements 36 and protrusions 21 are arranged outside of the channel 10.

Figure 5:
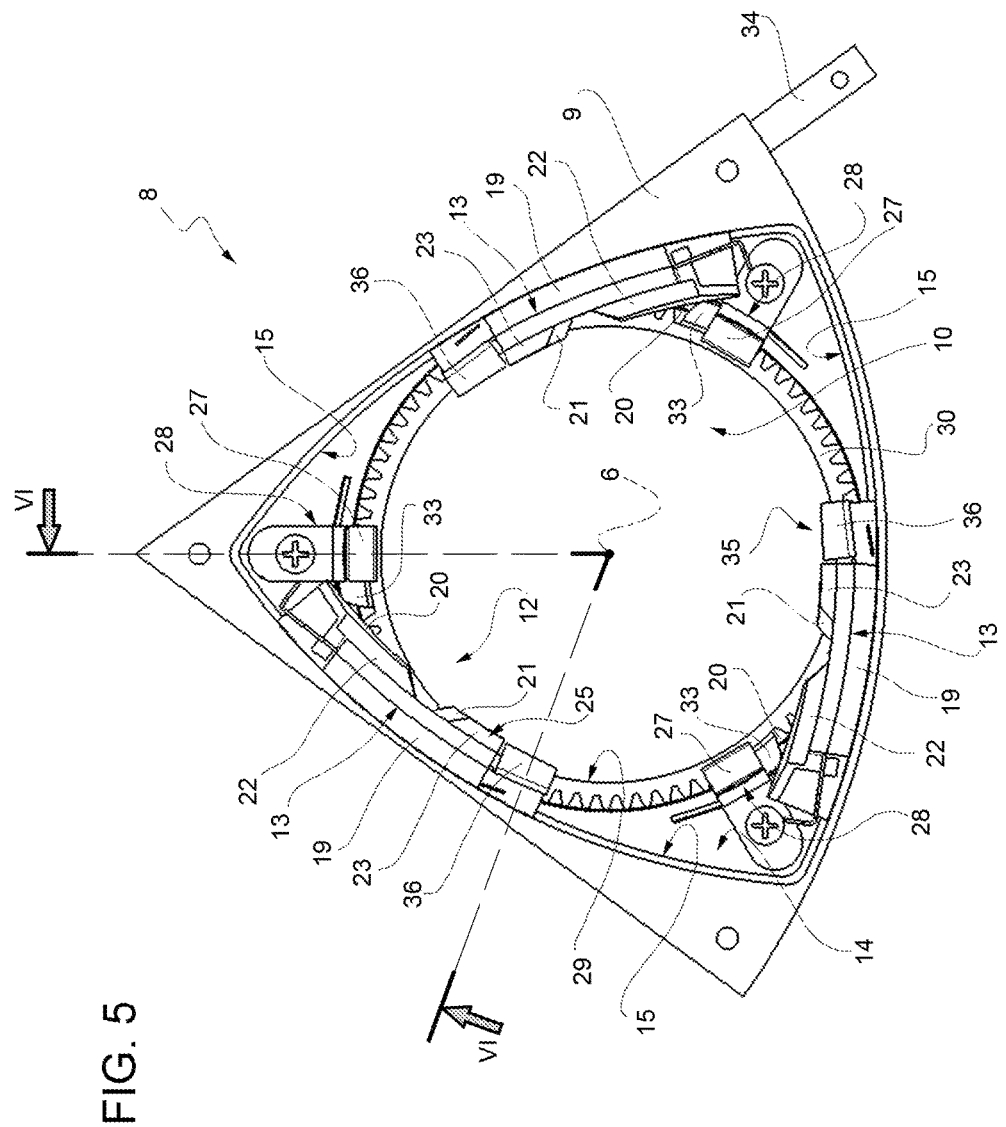
FIGS. 5 and 6 are similar to FIGS. 3 and 4, respectively, and show the dispensing group in a second operating configuration.

Intermediate Position—FIGS. 5 and 6

Following rotation of the toothed ring 30 in the aforementioned direction of forward movement (clockwise in FIG. 5), the segments 13 advance along the respective paths and, by moving in respective directions tangential to the channel 10, progressively move towards the outside of the channel 10. During this movement, the bosses 33 intercept the flat springs 28, radially pushing the respective thin plates 27 towards the outside of the channel 10. At the same time, the protrusions 21, advancing tangentially towards the inside of the channel 10, fit in between the flanges 3 of the last and penultimate cups 2.

The separator elements 36 also become arranged between the flanges 3 of the last and penultimate cups 2.

Figure 7:
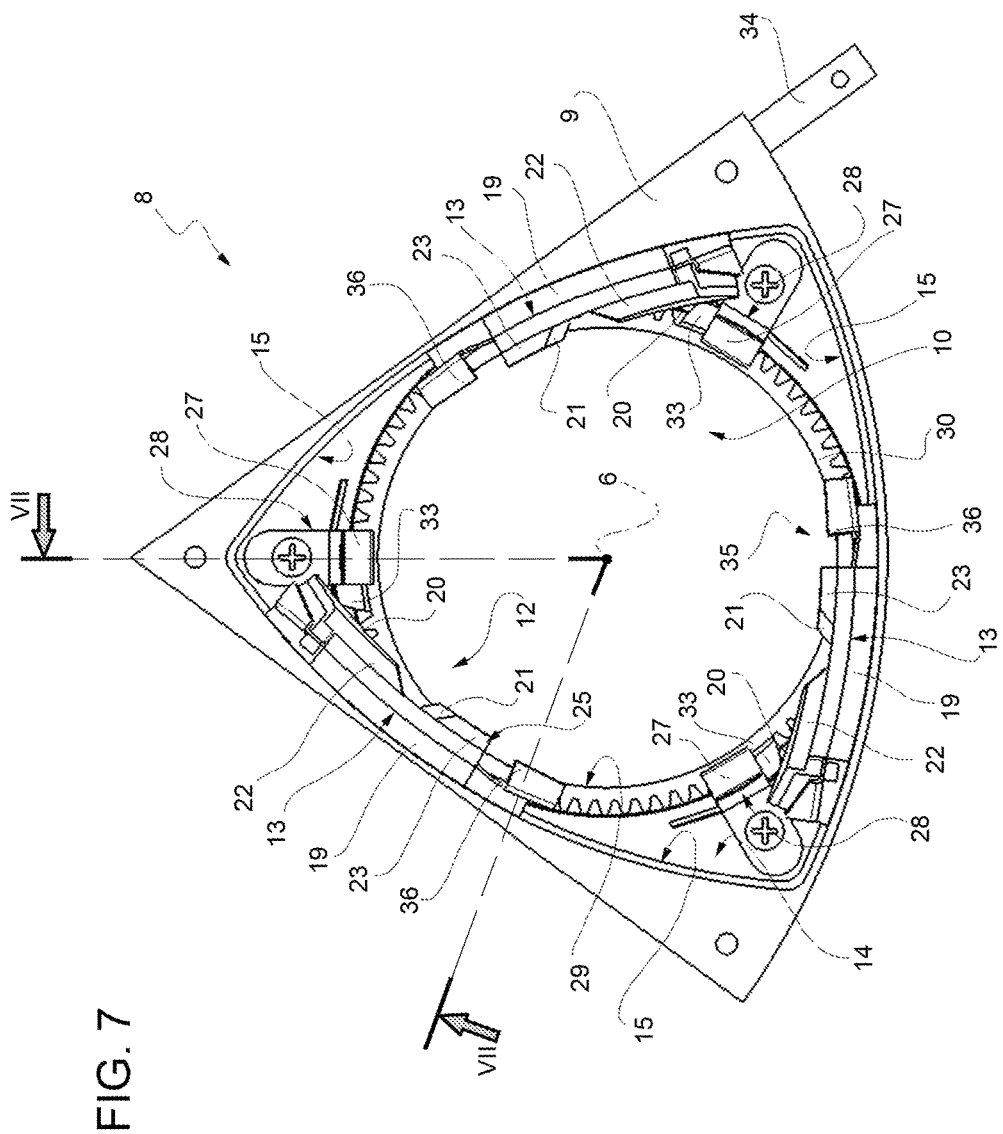
FIGS. 7 and 8 are similar to FIGS. 3 and 4, respectively, and show the dispensing group in a third operating configuration.
Figure 8:
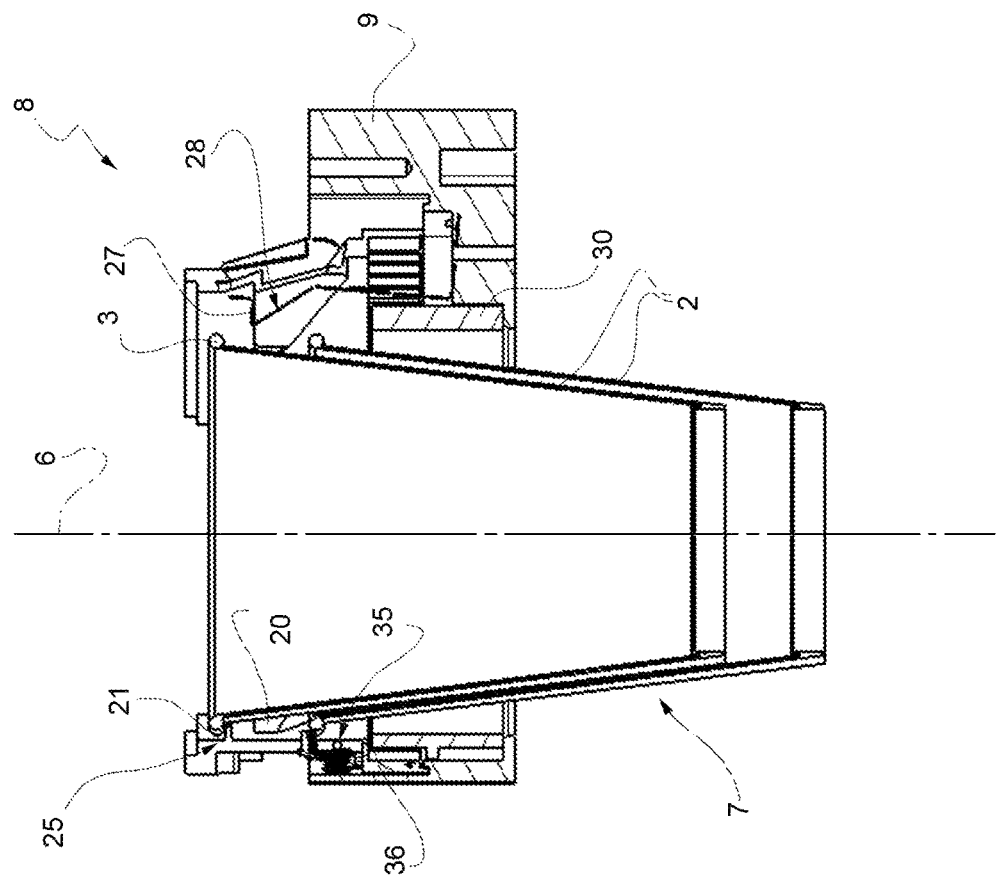

Final Position—FIGS. 7 and 8

This position is reached at the end of the forward rotation of the toothed ring 30.

During this movement, the segments 13 cause the shaped edges 39 of the respective plates 37 to engage the corresponding abutments 40 and, in consequence, cause the lowering of the respective separator elements 36, which push the flange 3 of the last cup 2 downwards and cause its complete detachment from the stack 7 and consequent fall.

In this position, the stack 7 remains resting on support plane 25, formed by protrusions 21.

Rotation in the opposite direction of the toothed ring 30 causes the protrusions 21 to tangentially slip out and move towards the outside of the channel 10 and, at the same time, causes protrusions 20 and the thin plates 27 to move towards the inside of the channel 10. In consequence, the stack 7, no longer supported by support plane 25, drops down and is repositioned on support plane 24.

During return to the rest position of the related segment 13, each protrusion 20 also performs a further function, in addition to that of restoring support plane 24 for the stack 7. In fact, as shown in FIG. 9, each protrusion 20 has an inclined lower profile that extends top to bottom from the end of the protrusion 20 facing the respective protrusion 21. If the last cup 2 of the stack 7 that has been pushed downwards by the separator elements 36 has not already become completely detached, but has remained dangling from the penultimate cup 2, when protrusions 20 retract towards the rest position, the respective inclined lower profiles intercept the flange 3 of the dangling cup 2 and impart a further downward thrust that ensures it drops.

In conclusion, regarding the forgoing, it is important to underline that the minimum number of segments 13 must be three, as in the example described and illustrated herein, but, according to other variants that are not shown, the support and release mechanism 12 may comprise a larger number of segments 13. In this case, the cavity 14 will be shaped in an adequate manner and have a number of curvilinear walls 15 equal to the number of segments 13.

The invention claimed is:

1. A cup dispensing apparatus for a beverage vending machine, the cup dispensing apparatus comprising:
   at least one dispensing group including:
      a magazine adapted to accommodate a stack of cups; and
      a releasing device having a through opening defining a channel with a substantially vertical axis, the releasing device adapted to be engaged by the stack of cups;
      wherein the releasing device is configured to support the stack of cups and to release, when operated, a last cup from a bottom of the stack of cups;
      wherein the releasing device includes:
         at least three releasing elements evenly distributed around the substantially vertical axis; and
         an actuating device connected to the at least three releasing elements to move the at least three releasing elements between a rest position in which the at least three releasing elements define a horizontal first support plane adapted to be engaged by the last cup of the stack of cups to support the stack of cups, and a release position in which the at least three releasing elements define a second support plane at a higher level than the horizontal first support plane and adapted to be engaged by a penultimate cup of the stack of cups to support the rest of the stack of cups;

wherein the at least three releasing elements are segments configured to translate, when the at least three releasing elements move from the respective rest positions to the respective release positions and vice versa, on a plane perpendicular to the vertical axis and along respective paths in respective directions tangential to a portion of the channel that is adjacent to the respective releasing element;

wherein the releasing device includes three separating devices each of which is mounted on a respective one of the at least three releasing elements to move downwards, with respect to the respective one of the at least three releasing elements, and impart a downward detaching thrust on the last cup when the one of the at least three releasing elements reaches the release position.

2. The cup dispensing apparatus of claim 1, wherein each of the at least three releasing elements has, on a side facing the substantially vertical axis, a first protrusion that is bounded at a top thereof by a substantially horizontal flat surface, is arranged inside the channel when the respective one of the at least three releasing elements is in the rest position, and on the outside of the channel when the one of the at least three releasing elements is in the release position, and defines, with the other first protrusions, the horizontal first support plane; each of the at least three releasing elements is further provided, on the same side facing the axis, with a second protrusion that is bounded at a top thereof by a substantially horizontal flat surface, is arranged on an outside of the channel when the one of the at least three releasing elements is in the rest position, and inside the channel when the respective one of the at least three releasing elements is in the release position, and defines, with the other second protrusions, the second support plane.

3. The cup dispensing apparatus of claim 1, wherein the releasing device includes a casing having a cavity that is coaxial to the substantially vertical axis, is laterally bounded by a number of side walls equal to the number of the at least three releasing elements, and has, on a plane perpendicular to the substantially vertical axis, a shape of a regular convex polygon circumscribed to the channel; each of the number of side walls defines a guide for a respective one of the at least three releasing elements during movement between the associated rest and releasing positions.

4. The cup dispensing apparatus of claim 1, wherein the actuating device is operable to cause the at least three releasing elements to perform a working cycle including a forward stroke, during which the at least three releasing elements move from the respective rest positions thereof to the respective release positions thereof, and a return stroke, during which the at least three releasing elements return to the respective rest positions thereof.

5. The cup dispensing apparatus of claim 4, wherein each of the three separating devices is mounted on board of a respective one of the at least three releasing elements; and the releasing device includes, for each of the at least three releasing elements, a fixed abutment designed to be engaged, during the forward stroke, by the respective one of the three separating devices to impart the downward movement to the separating device.

6. The cup dispensing apparatus of claim 5, wherein each of the three separating devices includes:
a thin flat element, which is movable, as a consequence of the movement of the respective one of the at least three releasing elements during the forward stroke, from an inoperative position, in which the thin flat element is on an outside of the channel, to an intermediate position, in which the thin flat element protrudes inside the channel and is inserted between the penultimate and a last cup of the stack of cups, and from the intermediate position to an operative position to impart a downward thrust on the last cup so as to cause the last cup to separate from the rest of the stack of cups; and
elastic means are provided between each of the three separating devices and the respective one of the at least three releasing elements to bring the separating device back to the inoperative position from the operative position during the return stroke of the releasing element.

7. The cup dispensing apparatus of claim 4, wherein:
each of the at least three releasing elements includes a toothed sector; and
the actuating device includes a toothed ring coaxial to the substantially vertical axis and meshing with the toothed sectors to move the releasing elements along the forward and return strokes.

8. The cup dispensing apparatus of claim 4, wherein:
the releasing device includes:
at least three auxiliary supporting elements for the stack of cups; the at least three auxiliary supporting elements are evenly distributed around the substantially vertical axis and alternating with the at least three releasing elements, and are movable, against action of elastic return means, between a normal operative position, in which the at least three auxiliary supporting elements protrude inside the channel to define, with the first protrusions, the first supporting surface, and an inoperative position, in which the at least three auxiliary supporting elements are on the outside of the channel;
the actuating device includes interception means configured to move the at least three auxiliary supporting elements from the operative position to the inoperative position during the forward stroke of the at least three releasing elements.

9. The cup dispensing apparatus of claim 1, wherein the at least one dispensing group includes a plurality of dispensing groups, respective ones of the releasing devices the plurality of dispensing groups are wedge-shaped on an outside and are arranged radially around a central rotation axis parallel to the substantially vertical axes of the at least three releasing devices.

10. The cup dispensing apparatus of claim 9, wherein the respective angular widths of the wedges defined by the at least three releasing devices are equal to or different from each other; the angular width of each of the wedges is proportional to a size of the cup dispensed by the respective ones of the releasing devices.

* * * * *